(12) United States Patent
Lanham

(10) Patent No.: US 7,047,817 B2
(45) Date of Patent: May 23, 2006

(54) LOAD MEASUREMENT APPARATUS AND METHODS UTILIZING TORQUE SENSITIVE LINK FOR PEDAL POWERED DEVICES

(75) Inventor: Gregory T. Lanham, Longmont, CO (US)

(73) Assignee: Forza, Inc., Longmont, CO (US)

( * ) Notice: Subject to any disclaimer, the term of this patent is extended or adjusted under 35 U.S.C. 154(b) by 144 days.

(21) Appl. No.: 10/779,038

(22) Filed: Feb. 17, 2004

(65) Prior Publication Data

US 2005/0178210 A1    Aug. 18, 2005

(51) Int. Cl.
*G01B 7/16* (2006.01)

(52) U.S. Cl. ........................................................ 73/773
(58) Field of Classification Search ................. 73/773, 73/774, 775, 781, 795
See application file for complete search history.

(56) References Cited

U.S. PATENT DOCUMENTS

| 5,257,540 A | 11/1993 | Bower et al. |
| 5,758,735 A | 6/1998 | MacCready, Jr. et al. |
| 5,816,599 A | 10/1998 | Soejima et al. |
| 5,860,329 A * | 1/1999 | Day .......................... 74/594.1 |
| 6,263,992 B1 | 7/2001 | Li |
| 6,418,797 B1 | 7/2002 | Ambrosina et al. |
| 6,447,421 B1 * | 9/2002 | Wren ......................... 475/170 |
| 6,487,932 B1 | 12/2002 | McIlraith |

* cited by examiner

*Primary Examiner*—Max Noori
(74) *Attorney, Agent, or Firm*—Harold A. Burdick

(57) ABSTRACT

Apparatus and methods for use in measurement of applied load at a chainring assemblage of a pedal powered device are provided. The apparatus includes a link adapted for interposition between a chainring attachment site located on a conventional chainring mount, or spider, and a corresponding chainring attachment locale at a conventional chainring. The link has a geometry and/or material composition selected to accommodate measurement of load exhibited between the attachment site and the corresponding chainring attachment locale. Means for measuring the load exhibited thereby is associated with the link.

20 Claims, 18 Drawing Sheets

LOAD MEASUREMENT APPARATUS AND METHODS UTILIZING TORQUE SENSITIVE LINK FOR PEDAL POWERED DEVICES

FIELD OF THE INVENTION

This invention relates to devices capable of measuring power output while pedaling a pedal powered device such as a bicycle, and, more particularly, relates to such devices located at the chainring assemblage of the device.

BACKGROUND OF THE INVENTION

Cycling enthusiasts continue to seek improvement in their performance riding a bicycle. One barrier to such improvement has been ready accessibility to means for measurement of performance both generally and in specific road situations (hilly terrain for example).

One common means used to monitor training performance is the heart rate monitor. While this is a fine training tool, it does have drawbacks, including difficulty, from one ride to the next, in gauging cyclist's riding intensity. It is, therefore, difficult to determine if any progress has been made in training using only a heart rate monitor.

A better way to keep track of a cyclist's performance is to monitor the power generated during a ride, and devices directed to measurement of a cyclist's power output have been heretofore suggested and/or utilized. One approach utilized by a variety of devices provides for a custom machined crank wherein the crank spider fingers are modified, providing a certain amount of elasticity, strain gauges being attached to the modified crank spider fingers to sense and measure deflection, and thus loading, at the modified crank spider fingers when the cyclist begins to pedal. Other designs utilizing similar replacement structures utilize measurement by means of stationary light emitting diodes attached to the bike frame and slotted timing disks at the modified crank assembly (i.e., when there is no load on the pedals and the crank is rotated the slots will pass the LED's at the same time, but when there is a load on the pedals the disk attached to the elastic modified crank spider will lag a reference disk). Power is then calculated by multiplying derived torque by the cyclist's cadence. The results can be displayed and/or stored in an on board processor. Such devices as these, however, are very expensive and structurally invasive (requiring a specially manufactured crank assembly), and aesthetically unappealing.

Another approach heretofore known and/or utilized measures torque in the bottom bracket axle by sensing the stress developed during pedaling thereat. A magnetic band is attached to the axle under or near the chainring assembly and a series of coils are coupled to the chainring assembly, the coils measuring magnetic fields generated from the magnetic bands. As force is applied to the pedals, the bottom bracket axle and magnet ring are torsionally loaded and the loading causes the magnetic flux lines (permeability) to change, thereby causing the voltage reading from the coils to change. This change in voltage is proportional to torque, and is utilized as discussed hereinabove to calculate power. Such arrangements as these are, however, complex, expensive and of debatable accuracy (since the device measures torque at the bottom bracket axle, it only receives load data from the side of the crank not having the chainrings thereat, i.e., only half of the actual performance data is collected). As before, such arrangements tend to be quite invasive, requiring a great deal of machining and assembly to allow for all the sensing equipment required, and may also require crank structures that are non-standard.

As may be appreciated from the foregoing, improved methods and devices for gauging the power output of a cyclist could be utilized.

SUMMARY OF THE INVENTION

This invention provides apparatus and methods for use in measurement of a cyclist's performance during a ride by measuring applied loads developed by the cyclist. The apparatus and methods provided are inexpensive, are aesthetically unobtrusive, require no modification of major components, utilizing the existing structure of a standard chainring assemblage (i.e., the existing spider and chainring or rings, unmodified), are simple to install and maintain, and provide accurate output. The apparatus and methods of this invention are adapted for use with many types of pedal powered devices utilized by cyclists, for example, velocipedes such as on and/or off road bicycles, tricycles and the like, and/or various similarly constructed fitness and training apparatus, both mobile and stationary, and may be referred to hereinafter for ease of description as "cycle(s)" for use by "cyclist(s)", it being understood that the broader meaning is intended.

The apparatus of this invention is used in measurement of applied load at a conventional chainring assemblage of a pedal powered device, the chainring assemblage including a chainring mount, or spider, and at least one chainring. Such conventional chainring mounts have crank arms affixed thereto and chainring attachment sites defined at an outer extent thereof (at the ends of the spider's radiating fingers). Conventional chainrings have corresponding attachment locales defined thereat that are identifiable with different ones of the attachment sites.

The apparatus itself includes a link adapted for interposition between one of the chainring mount attachment sites and a corresponding one of the chainring attachment locales. The link has a geometry and/or material composition selected to accommodate measurement of load exhibited between the attachment site and the chainring attachment locale. A preferred embodiment of the link has a first end adapted for connectability with the attachment site and a second end adapted for connectability with the corresponding attachment locale. A central portion of the link is configured to be resiliently load sensitive. In the preferred embodiment, the link is constructed of a durable material with a known modulus of elasticity thereby delivering a reliable and repeatable displacement with load.

The method of this invention, for measuring applied load at the chainring assemblage exhibited between the chainring mount and the chainring, includes linking a chainring mount attachment site and a corresponding chainring attachment locale. Either strain developed at the linking or extent of decoupling between the chainring mount attachment site and the corresponding chainring attachment locale accommodated by the linking is measured, and based on the measurements an output indication is provided for the cyclist.

It is therefore an object of this invention to provide improved apparatus and methods for use in measurement of a cyclist's performance during a ride.

It is another object of this invention to provide apparatus and methods for use in measurement of applied loads developed by a cyclist during a ride that are inexpensive, are aesthetically unobtrusive, require no modification of major components, utilize existing structure of a standard cycle chainring assemblage, are simple to install and maintain, and provide accurate output.

It is still another object of this invention to provide a link interposable between a chainring mount and chainring that is constructed of a durable material with a known modulus of elasticity thereby delivering a reliable and repeatable displacement with load.

It is yet another object of this invention to provide, for use in measurement of applied load at a chainring assemblage or a pedal powered device that includes a chainring mount having crank arms affixed thereto and chainring attachment sites defined at an outer extent thereof with at least one chainring having corresponding attachment locales identifiable with different ones of the attachment sites, an apparatus including a link adapted for interposition between one of the chainring mount attachment sites and one of the corresponding chainring attachment locales, the link having a geometry or material composition selected to accommodate measurement of load exhibited between the attachment site and the chainring attachment locale.

It is still another object of this invention to provide, for use in measurement of applied load at a chainring assemblage of a pedal powered device that includes a chainring mount and at least one chainring, the mount having plural radiating fingers with chainring attachment sites defined at an outer extent of each of the fingers, the chainring having corresponding attachment locales identifiable with different ones of the attachment sites, an apparatus including a link having a first end adapted for connectability with one of the attachment sites, a second end adapted for connectability with one of the corresponding attachment locales, and a central portion between the ends configured to be resiliently load sensitive.

It is yet another object of this invention to provide a method for measuring applied load at a chainring assemblage of a pedal powered device, the applied load exhibited between a chainring mount and a chainring, the chainring mount having chainring attachment sites defined at an outer extent thereof and the chainring having corresponding attachment locales identifiable with different ones of the attachment sites, the method including the steps of linking one of the chainring mount attachment sites and one of the corresponding chainring attachment locales, and measuring either strain developed at the linking or extent of decoupling between the one chainring mount attachment site and the one corresponding chainring attachment locale accommodated by the linking and providing an output indication based thereon.

With these and other objects in view, which will become apparent to one skilled in the art as the description proceeds, this invention resides in the novel construction, combination, and arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 2:
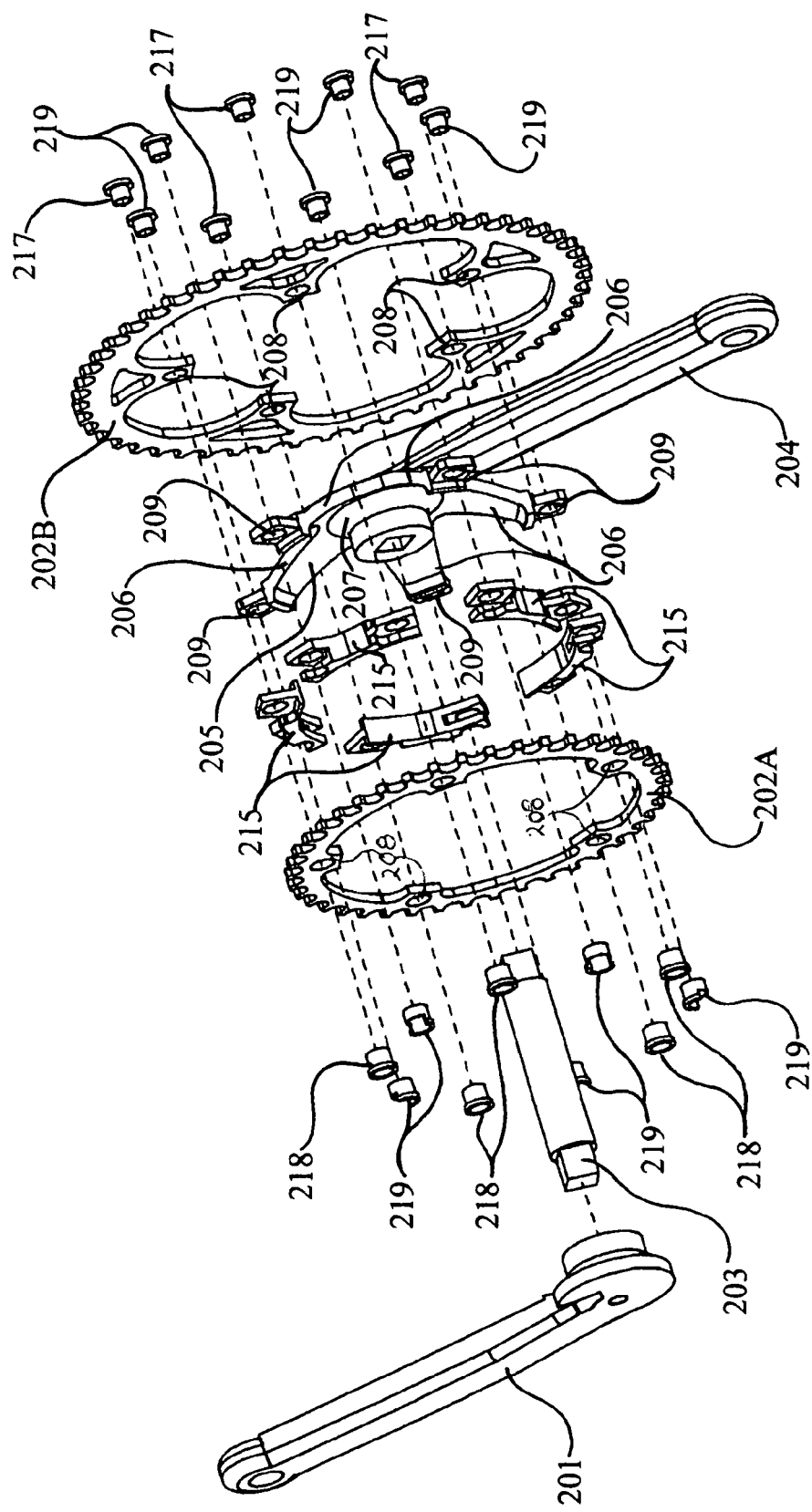
FIG. 2 is an exploded view of the chainring assemblage of FIG. 1 with a first, and presently preferred, embodiment of the link of the apparatus of this invention interposed thereat.

A conventional cycle chainring and crank assemblage, 200, is shown in FIG. 2. The apparatus and methods of this invention, as described hereinbelow, may be applied with all such conventional assemblages. Crank arm 201 is spaced from chainrings 202A and 202B (a greater or lesser number of chainrings may be provided in any give embodiment used with the apparatus and methods of this invention, as is known), and is attached to the drive train of the cycle by bottom bracket axle 203 (see also FIG. 2). Crank arm 204 is attached to (or integral with) chainring mount 205 (a conventional "spider", for example, having radiating fingers 206—typically five fingers extending radial out from center 207 of mount 205), mount 205 receiving axle 203. Corresponding structural attachment locales 208 of chainrings 202A and 202B are affixed at attachment sites 209 at the outer extent of mount fingers 206 (see also FIG. 2) using nut and bolt assemblies.

Figure 1:
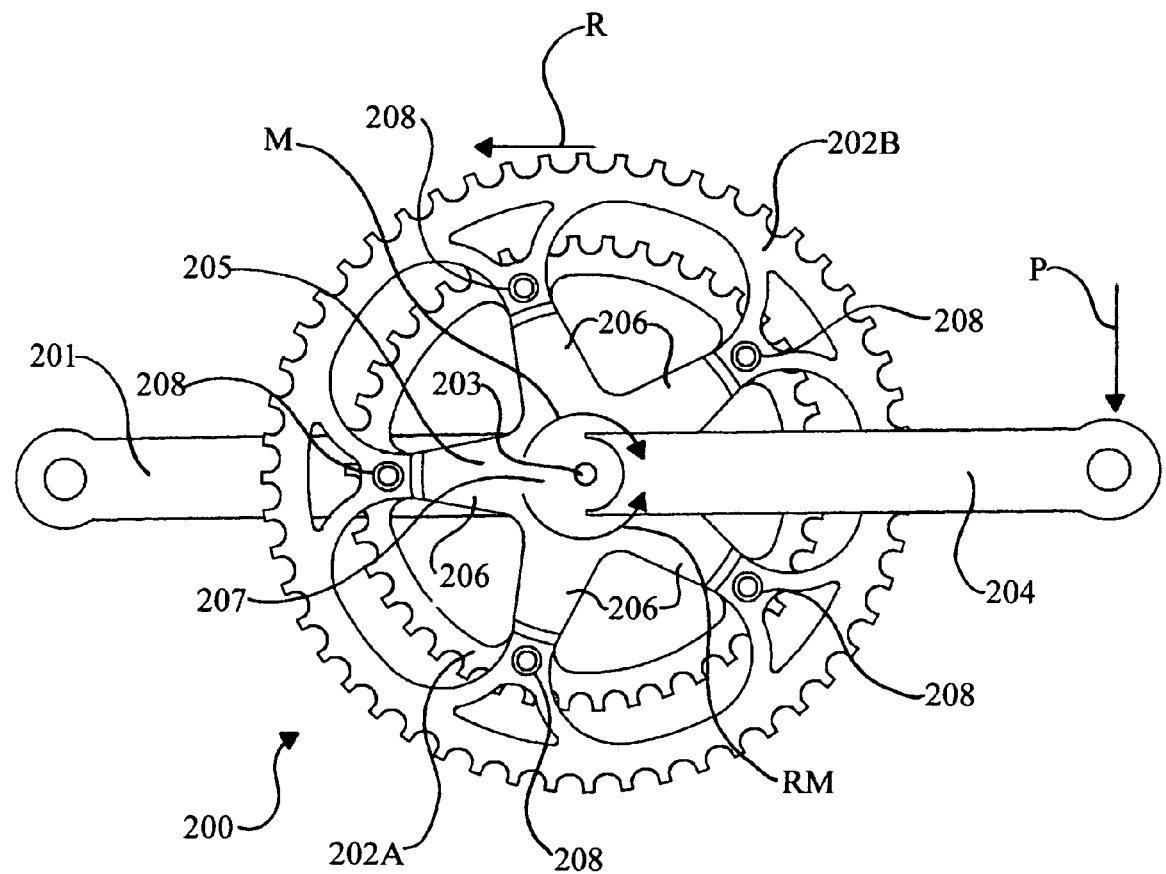
FIG. 1 is an front elevation view illustrating pedal loads and moment of a conventional cycle chainring assemblage to which the apparatus and methods of this invention may be applied.

As shown by the arrows in FIG. 1, the typical assemblage 200, pedal force P is applied by the cyclist to the ends of crank arms 201 and 204 (in turn) which produces a clockwise moment M, about bottom bracket axle 203 causing rotation of mount 205. A reactionary chain force R located at the point where the cycle chain (not shown) first meets chainring 202A or 202B (depending on gearing), produces a counter clockwise moment RM that opposes moment M. It is these two opposing moments that are utilized by the apparatus and methods of this invention to provide an indication of power generated by a cyclist.

Figure 3:
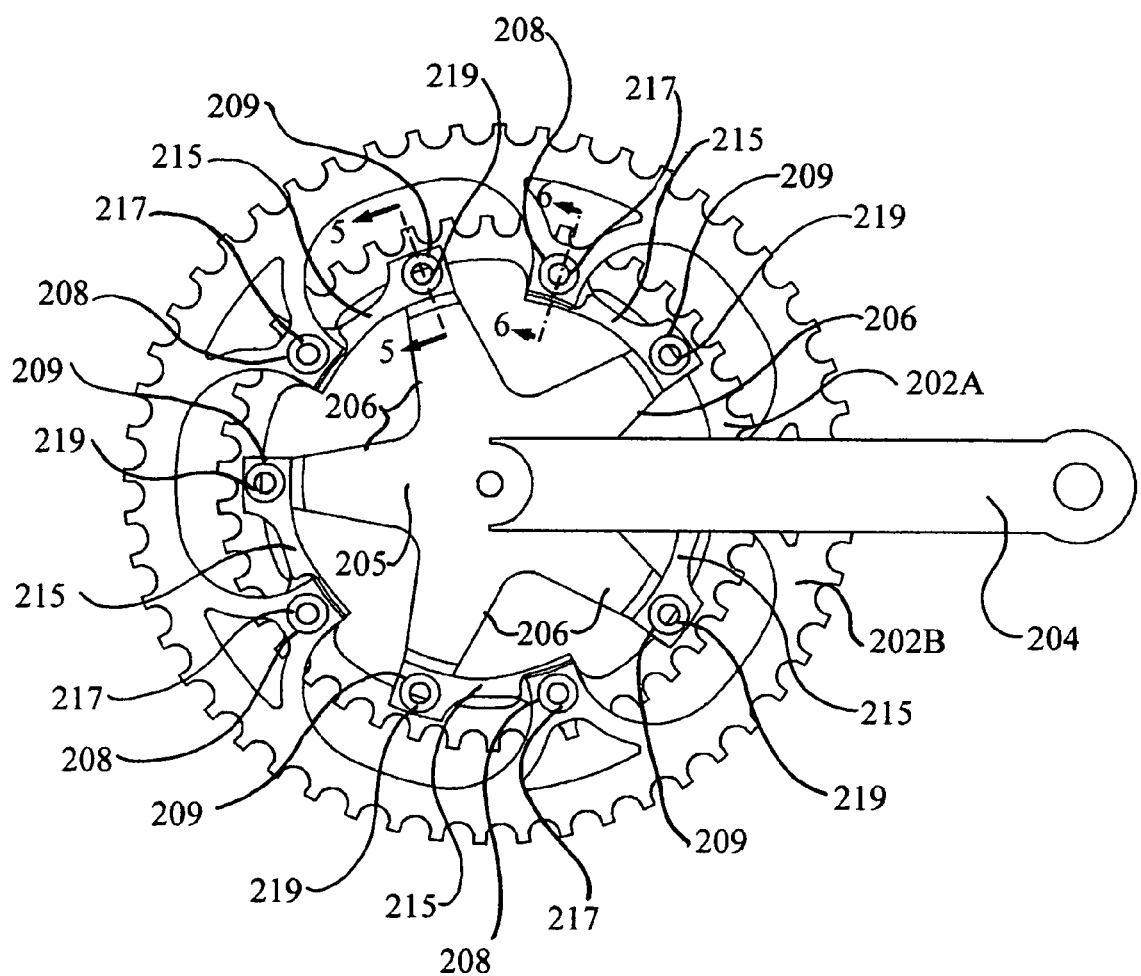
FIG. 3 front view of an assembled chainring assemblage and link of this invention as shown in FIG. 2.

As illustrated in FIGS. 2 and 3, a first, and presently preferred, embodiment of link 215 of the apparatus of this invention is attached between each attachment site 209 at the outer extent of fingers 206 of mount 205 and the corresponding attachment locales 208 of chainrings 202A and 202B. Other than links 215, only specially adapted outer chainring bolts 217, inner chainring bolts 218, and notched mounting assemblies 219 (each assembly including a notched inner bolt and an outer bolt) need to be provided to allow mounting of this invention with a conventional chainring assemblage 200 (there are preferably as many links 215 as there are fingers 206).

Figure 4A:
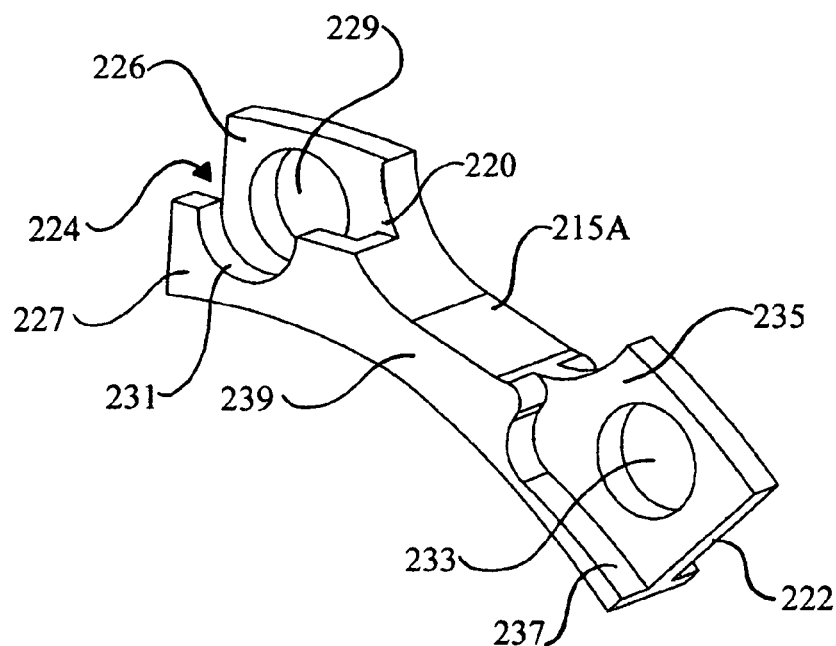
FIG. 4A is a perspective view of the link shown in FIG. 3.
Figure 4B:
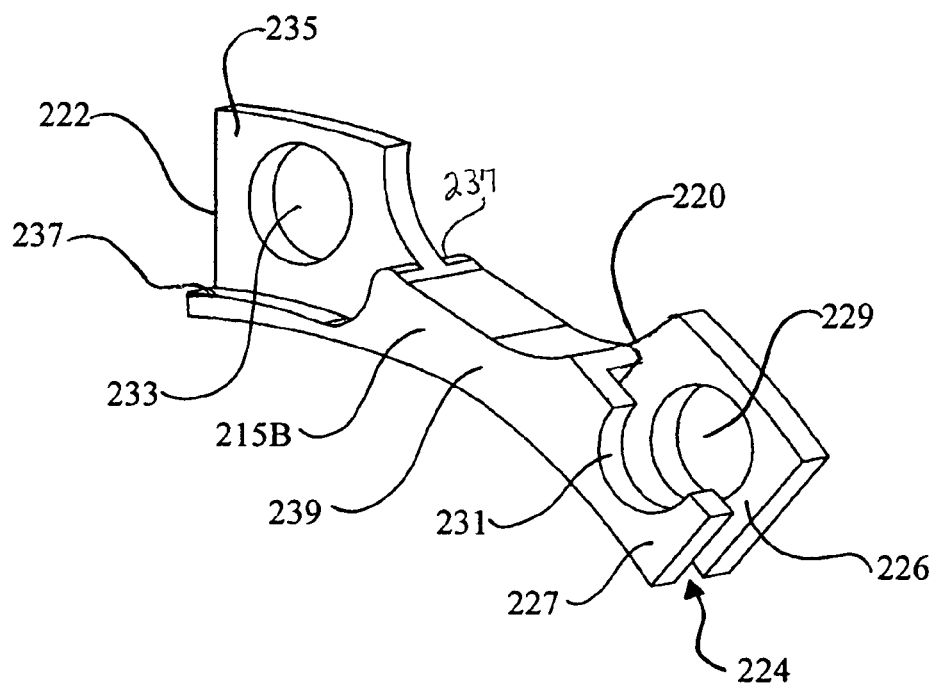
FIG. 4B is a perspective view of a link substantially as shown in FIG. 3 but oppositely configured.

Because link 215 may be applied to sense either tensile or compressive loading as discussed hereinafter, while links 215 are all operationally equivalent, two oppositely configured links 215 are provided as shown in FIGS. 4A and 4B. Link 215A in FIG. 4A is configured for mounting in a tensile loading configuration (see FIG. 7) while link 215B in FIG. 4B is configured for mounting in a compressive loading configuration. These different configurations and mountings may be used independently of or jointly with one another (though for simplicity of description, only independent applications are shown hereinafter).

In either case, link 215 includes first end 220 adapted for connection with attachment sites 209 of mount fingers 206 of chainring mount 205 and second end 222 adapted for connection with corresponding attachment locales 208 of chainrings 202A and 202B. End 220 is characterized by finger receiving slot 224 formed by wall 226 and notched wall 227. An attachment site 209 of a mount finger 206 is received at slot 224 and held thereat by a mounting assembly 219 (threadably engageable, for example), the outer bolt thereof inserted through mounting hole 229 and the notched inner bolt thereof inserted into mounting opening 231 formed by notched wall 227 and the inner circumference of chainring 202A and thereby accommodating chainring 202A (see FIG. 5). Chainring mounting hole 233 through wall 235 centrally extending from support bed 237 at end 222 of link 215 is used to attach link 215 with chainrings 202A and 202B attachment locales 208 using the outer chainring bolts 217 and the inner chainring bolts 218 (threadably engageable with each other, for example; see FIG. 6). Central portion 239 of link 215 extends between ends 220 and 222 and is characterized by a narrowed profile oriented to angularly offset ends 220 and 222 relative to one another.

Figure 5:
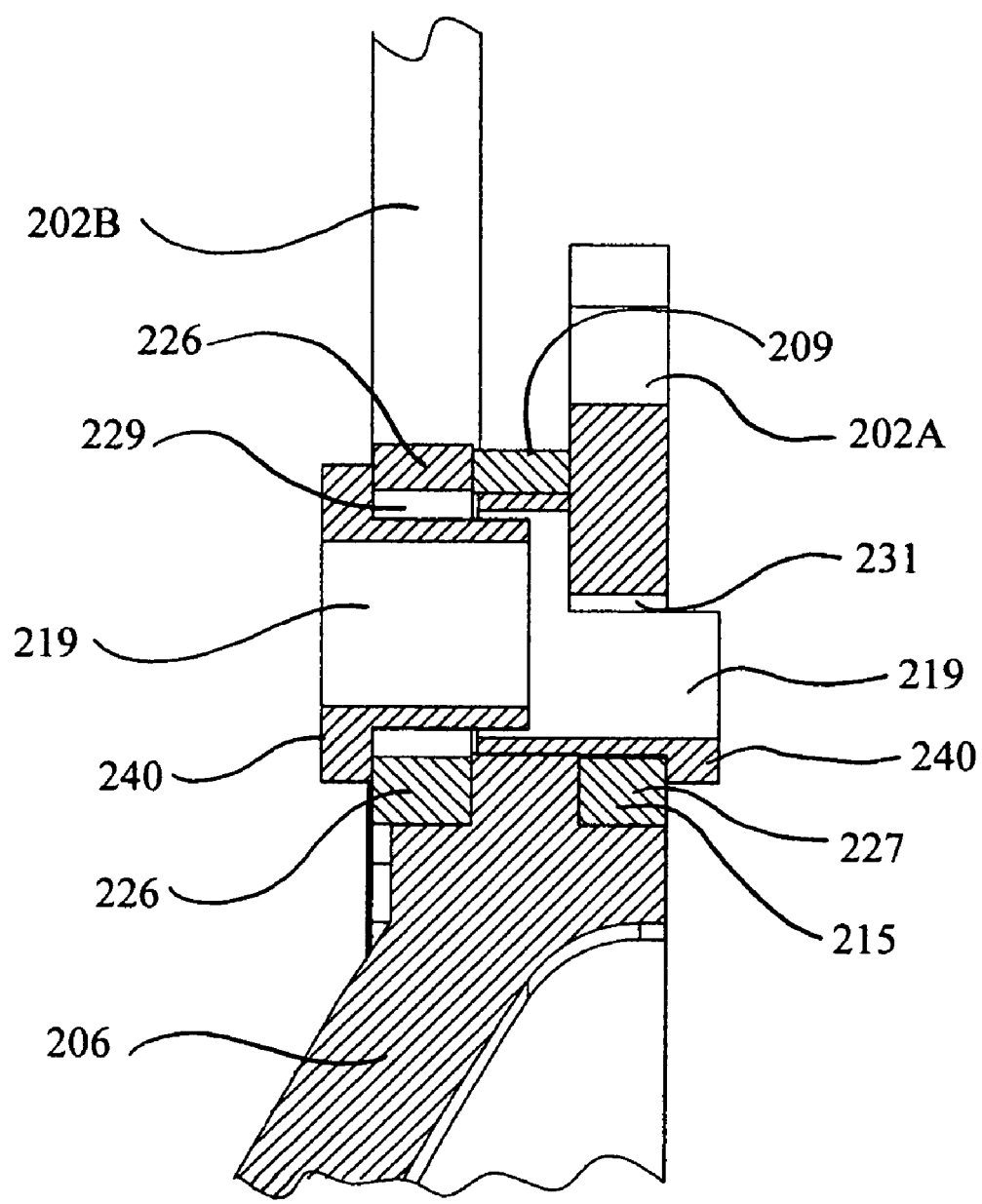
FIG. 5 is a sectional view taken through section lines 5—5 of FIG. 3.

As shown in FIG. 5, the notched inner bolt of assembly 219 is notched so that a standard small chainring 202A can be installed without interfering with link 215. The notched inner bolt extends through hole 231 and at least partially through the hole at attachment site 209 of mount finger 206. The outer bolt of assembly 219 is inserted into hole 229 and at least partially through the hole at attachment site 209 of mount finger 206 and threads into the notched inner bolt until heads 240 are lodged adjacent to link walls 226 and 227 thereby securing link 215 to finger 206.

Figure 6:
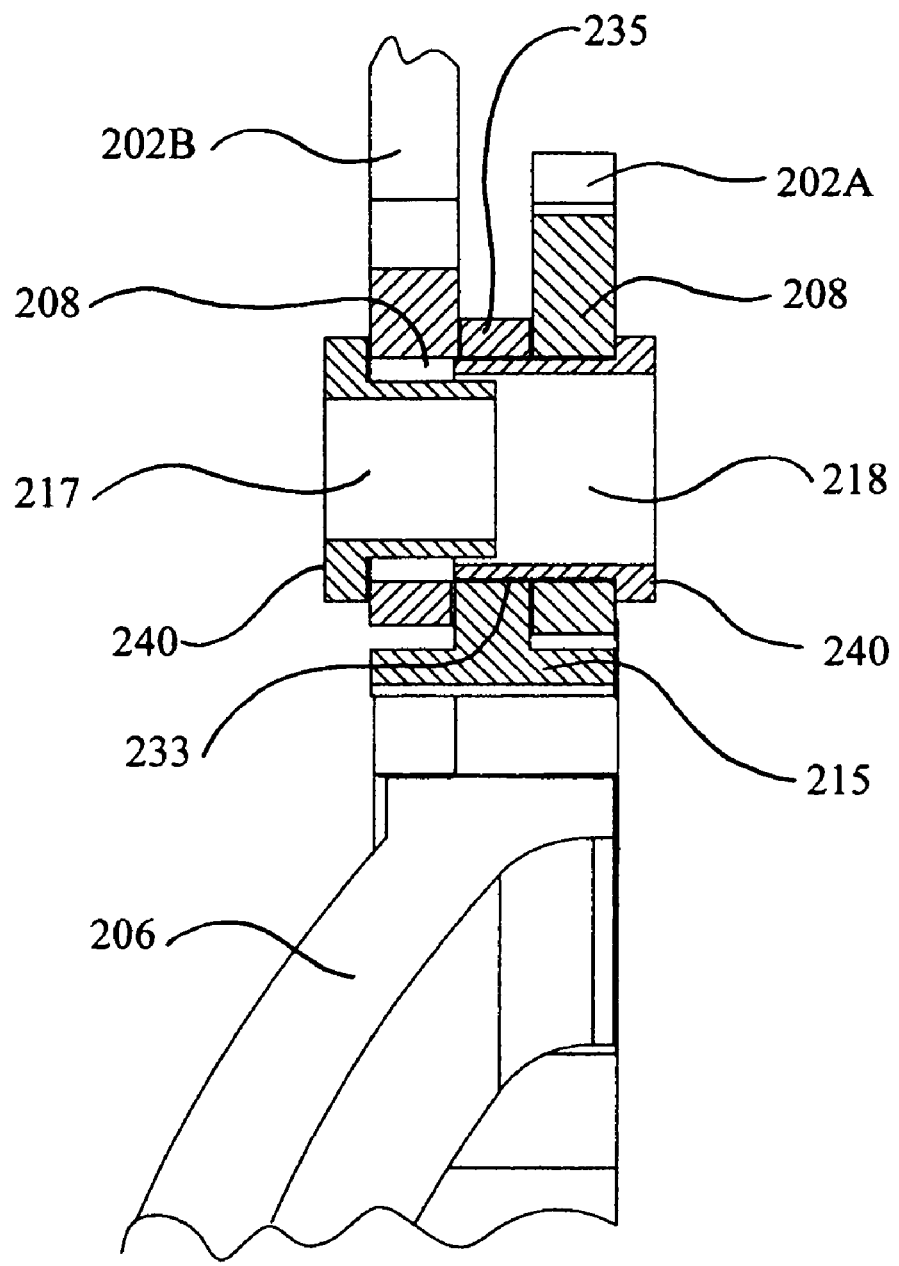
FIG. 6 is a sectional view taken through section lines 6—6 of FIG. 3.

As shown in FIG. 6, the mounting holes in locales 208 of small chainring 202A are aligned with holes 233 of walls 235 at ends 222 of links 215. Inner chainring bolts 218 are inserted therethrough. Mounting holes in locales 208 of large chainring 202B are aligned with holes 233 and outer chainring bolts 217 are inserted therethrough and threaded to inner chainring bolts 218, thereby securing chainrings 202A and 202B to link 215 when heads 240 thereof are brought adjacent to the chainrings.

Figure 7:
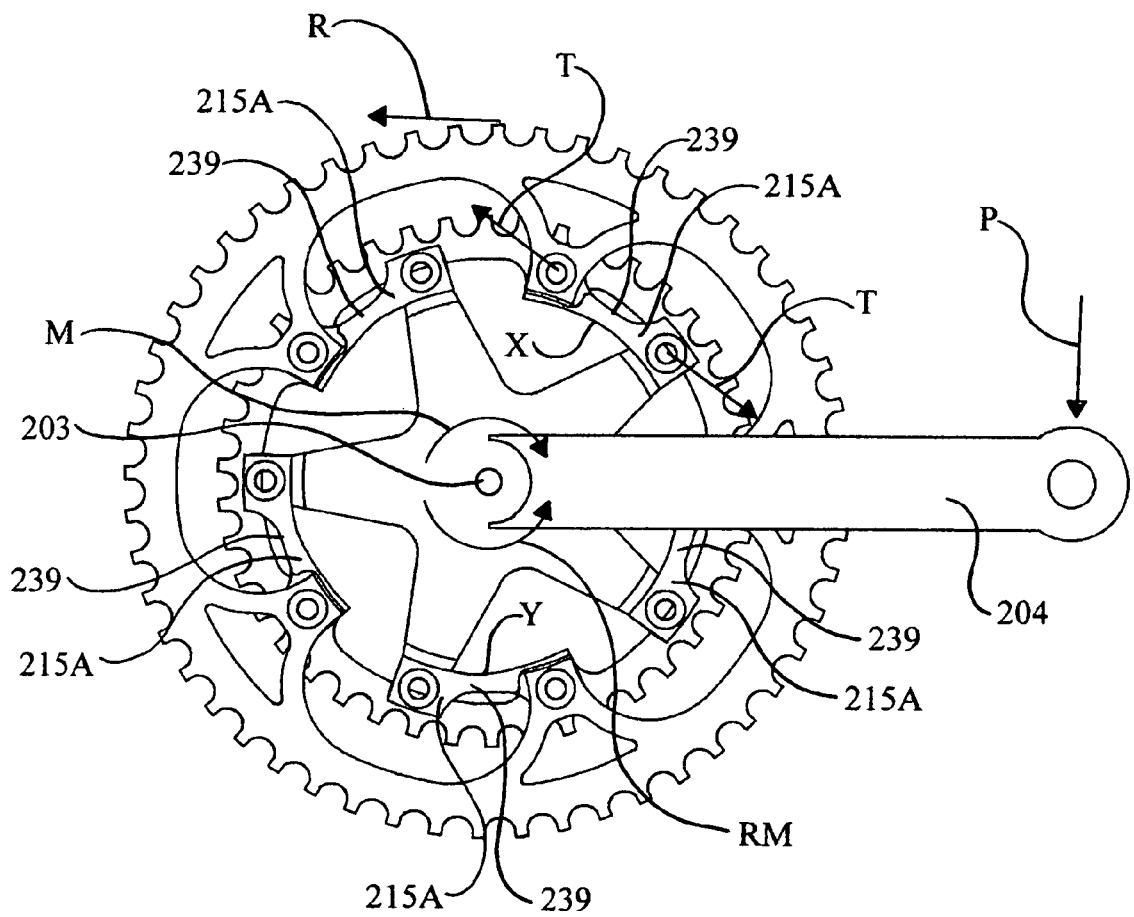
FIG. 7 is an illustration of applied pedal load and moment exhibited at the link apparatus shown in FIG. 3.

FIG. 7 illustrates how link 215A is loaded during a pedal cycle. When force P (pedal force) is applied to the end of crank arm 204, moment M is produced about bottom bracket axle 203. At the same time, chain force R produces an opposing moment RM. These moments produce strain in link 215A at central portion 239 thereof. In this assembled configuration, when the chainring assemblage is loaded link 215A is subjected to a tensile load T.

Figure 8:
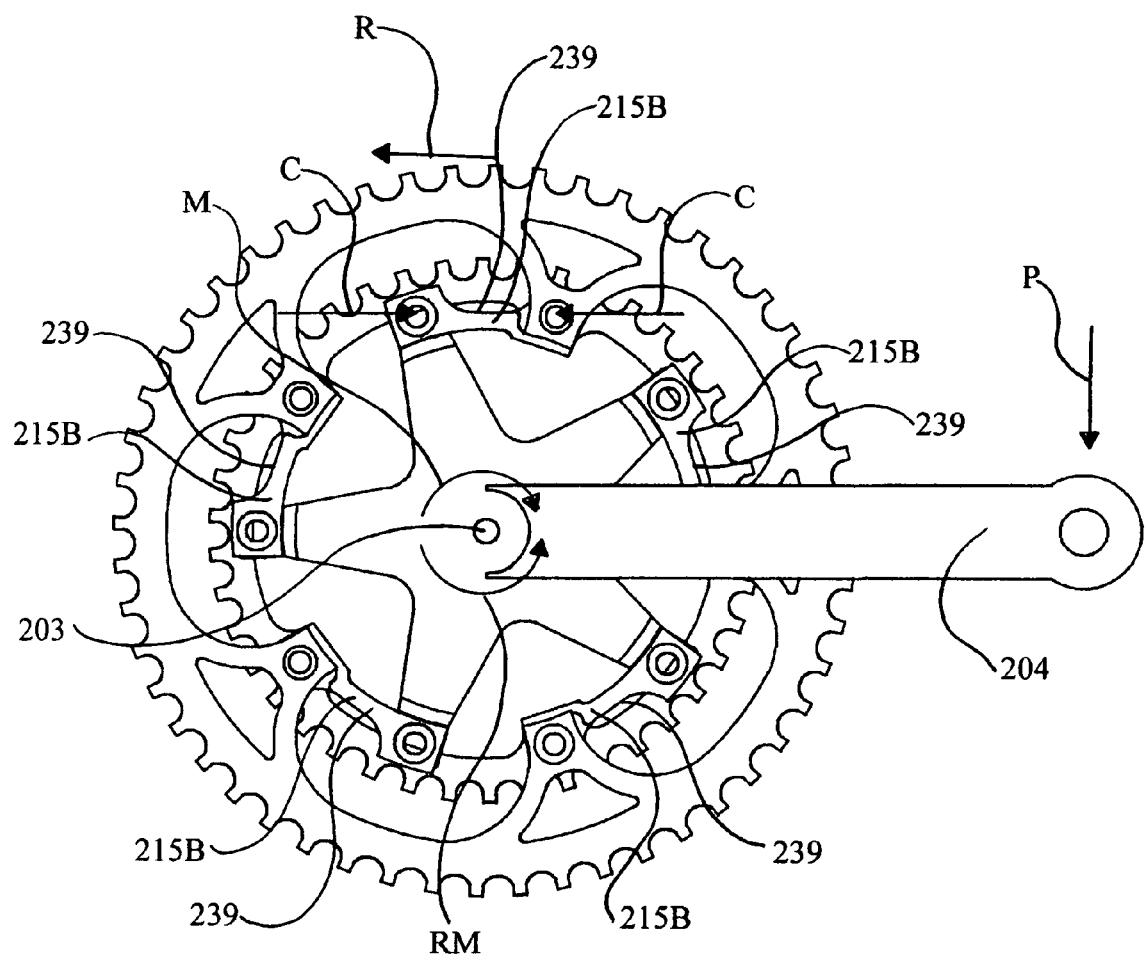
FIG. 8 is an illustration of applied pedal load and moment exhibited at an installed link apparatus as shown in FIG. 4B.

FIG. 8 illustrates how link 215B is loaded during a pedal cycle. When the pedal force P is applied to crank arm 204, link 215B is subjected to a compressive load C. Thus, as may be appreciated from the foregoing, link 215 may be simply configured for assembly to detect either tensile or compressive loading.

While for ease of illustration link 215 is shown having a length such that chainring attachment holes 233 extend to an offset position about half way between chainring mount fingers 206, the actual length of a link 215 and the resulting offset may be quite different depending on overall design. The overall geometry of and/or material used in constructing any particular configuration of link 215 dictate the sensitivity of the apparatus of this invention. The material used must be load sensitive yet resilient and durable, having a known modulus of elasticity. For example, as shown herein, link 215 may be made of 7075 aluminum, with a modulus of elasticity of about $10 \times 10$ $E^6$ PSI, an overall length of 2.5", a length at central portion 239 between ends 220 and 222 of about 0.6", a width at central portion 239 of about 0.45" and middle portion thickness of about 0.21". Such a configuration will prove quite sensitive and reliable over long periods of use (up to or exceeding ten million cycles between link replacements), and responsive yet durable to either tensile or compressive loads with resilient response upon load removal.

Figure 9:
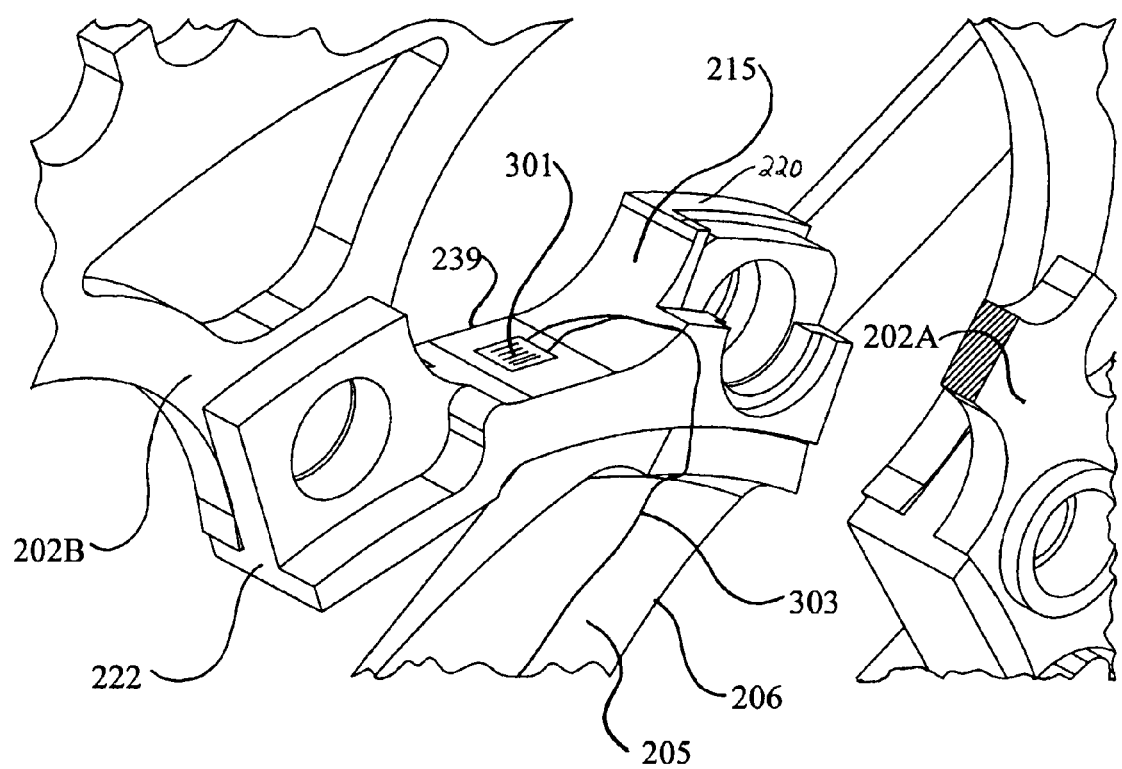
FIG. 9 is a partial perspective view illustrating one possible placement of a strain gauge at the link of this invention shown in FIG. 4B (location is the same for the link of FIG. 4A)

Referring to FIG. 9, the strain developed at link 215 may be measured by any known strain sensing device, such as strain gauge 301 located at the area of the highest strain (preferably at central portion 239, for example, though it could be positioned at almost any position on the link), to provide a signal output indicative of load applied at the chainring assemblage and thus in turn indicative of a cyclist's application of force to the pedals. Each gauge 301 deployed (one or more may be utilized in any given application of the apparatus of this invention) includes signal conductive wire 303 attached to extend down finger 206 of chainring mount 205.

Figure 10:
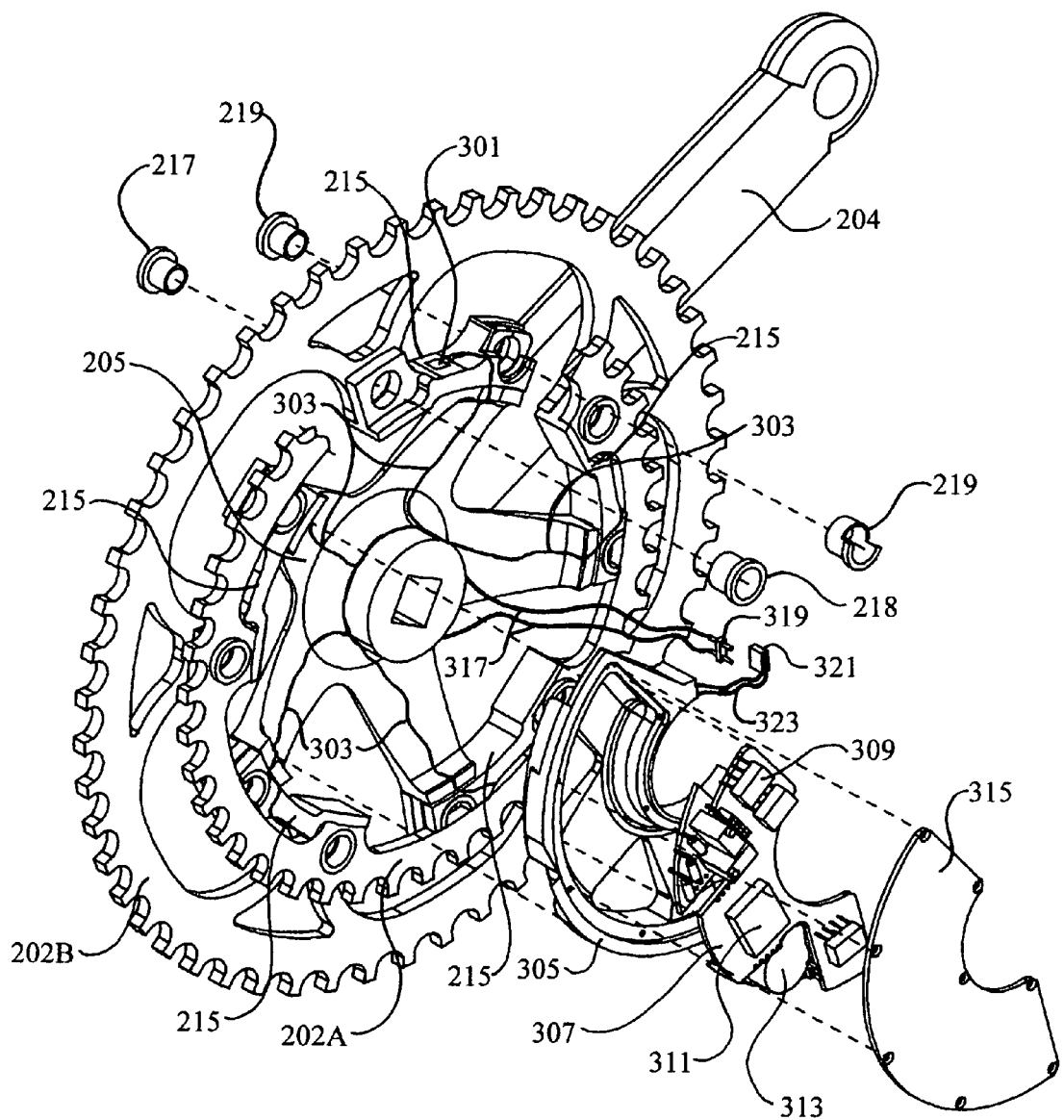
FIG. 10 is an exploded view of the apparatus of this invention of FIG. 3 including electronic components.

Turning now to FIG. 10, electronics housing base 305 is attached to the inside of mount 205 utilizing any known method. Electronic circuit board assembly 307 is held at housing base 305, and has amplifiers 309, radio transmitter 311, and battery 313 maintained thereat. Housing cover 315, attaches to the housing base 305 providing protection from the elements. Strain gauge or gauges 301 are connected with the electronics via connector wire 317 terminating at connector 319. Mating connector 321 is connected to wires 323 which enter through base 305 terminating at electronic circuit board assembly 307.

Where more than one strain gauge 301 is used (for example providing one at each link 215), gauges 301 are wired in series. As the cyclist pedals, chainring assemblage 200, and thus links 215, are strained, each link 215 strained to different extent depending on its relative location relative to the chain force R.

For example, referring to the assembly configuration of FIG. 7, the strain level at point X is higher than at point Y because X is closer to the chain force R. As a result, as the distance between a link 215 and chain force R increases, the strain level thereat decreases, and as the cycle is competed (i.e., as a link 215 approaches chain force R) the strain level increases. Thus, preferably a strain gauge 301 would be secured to each link 215, thereby providing the best estimate of actual torque since the strain gauges are connected in series providing an average strain for the grouping of links 215.

Figure 11:
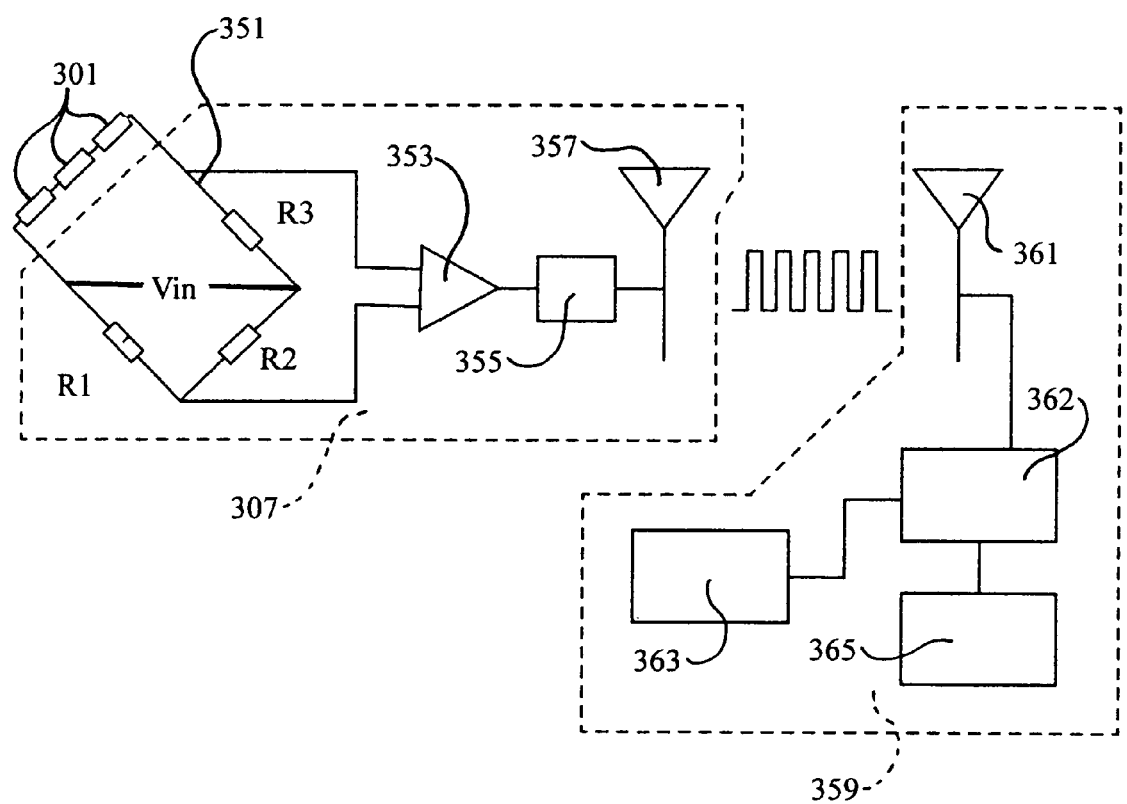
FIG. 11 is an electronic diagram illustrating interconnection of the components of the apparatus of the invention of FIG. 10.

Referring to FIG. 11, where a plurality of strain gauges 301 connected in series is utilized, the strain gauges are connected to one leg of wheatstone bridge 351. The signal therefrom is amplified at amplifier 353 to a usable level and coupled to voltage to frequency converter 355. The resulting output frequency is applied at radio transmitter 357 were the signal is transmitted to a receiver, processing and display unit 359 mounted to the cycle frame. Unit 359 includes receiver antenna 361. The received modulated signal is received and processed at microprocessor 362 which also receives cadence indicative signals from a cadence sensor 363 (i.e., a Hall effects sensor and magnet, for example, to count revolutions of mount 205 and provide an output indicative of angular velocity thereof). Output from processor 362 is stored and/or displayed at display device 365 (an LCD display for example).

The amplified strain output signal from amplifier 353 is (demonstrably) proportional to torque, and is substantially linear in nature. Torque value is then expressed in the following equation:

$$\tau = \Theta(\gamma) + B$$

Where $\tau$=Torque, $\Theta$=Calibration factor (determined during calibration), $\gamma$=Amplified strain gauge output, and B=Intercept (constant).

This torque value is used to calculate power (P) with the following equation:

$$P = \tau \omega$$

Where $\omega$=Cadence (angular velocity).

Combining these two equations, the power equation then is:

$$P = (\Theta(\gamma) + B)\omega$$

Figure 12:
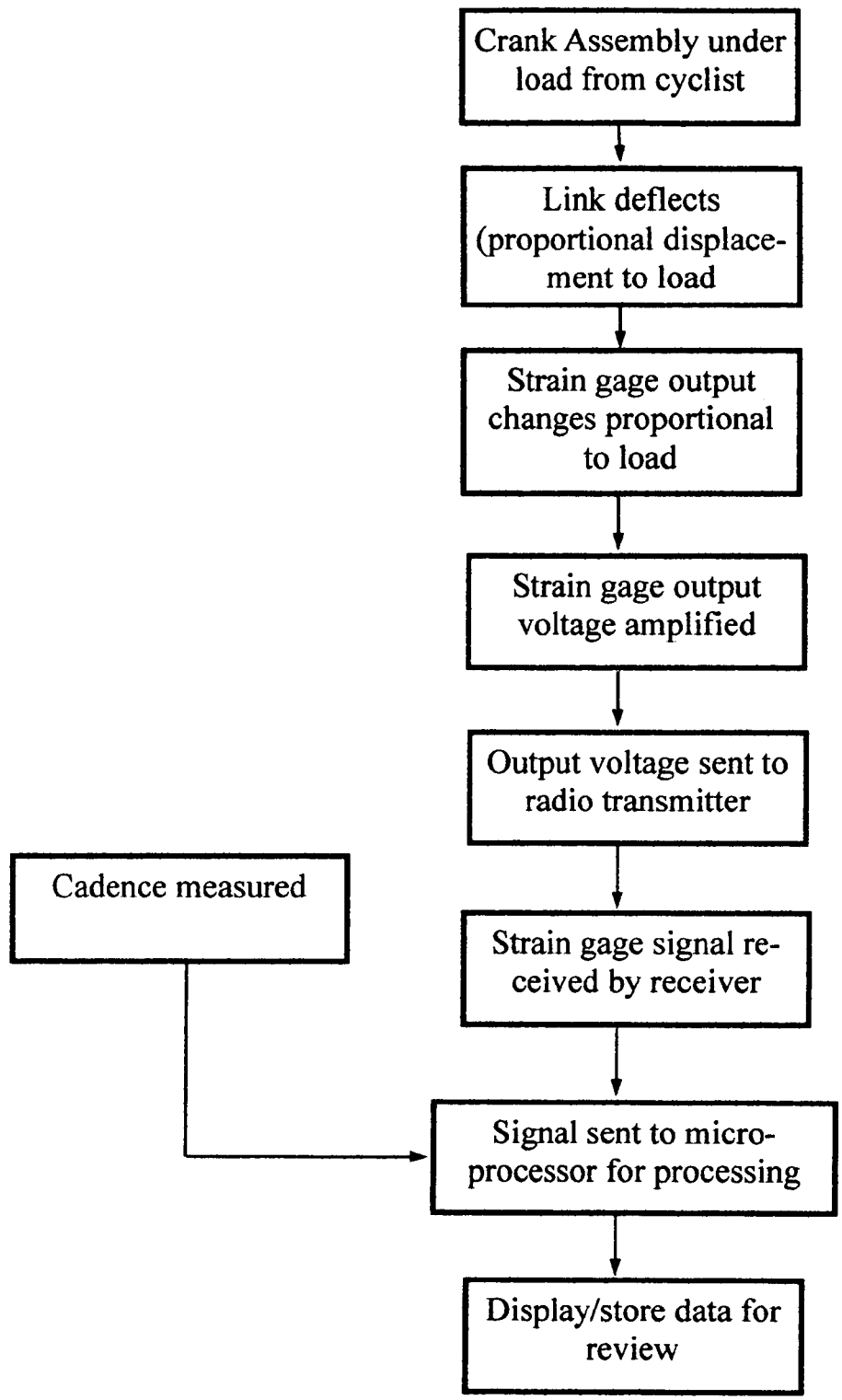
FIG. 12 is a flow diagram illustrating on-board processing and output utilizing the apparatus of FIG. 11.

Operation of the apparatus of this invention is summarized in the flow chart of FIG. 12. When the cyclist applies load to the pedals, the load is transferred (through mount fingers 206) to link 215 causing link deflection. Strain gauge(s) 301 sense the deflection and output signal (voltage signals typically) to bridge circuit 351. The strain gauge voltage is sent to amplifier 353 and output at radio transmitter 357. The radio signal is received by receiver antenna 361 and provided to processor 362. Cadence measurements are made and provided to processor 362, and responsive to receipt of these signals the microprocessor provides a signal output indicative of power output for storage and/or display (many methods of expressing the display of output power could be conceived, for example expressing the output in terms of torque, work, or arbitrary numerical or graphic display).

Figure 13:
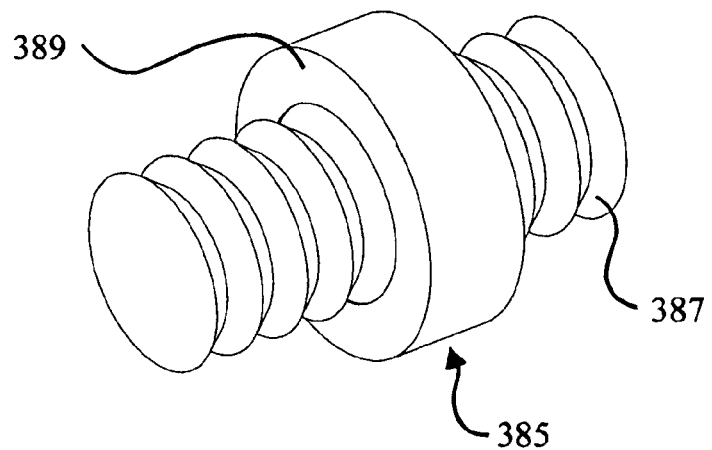
FIG. 13 is a perspective view of a second embodiment of the link of the apparatus of this invention.
Figure 14:
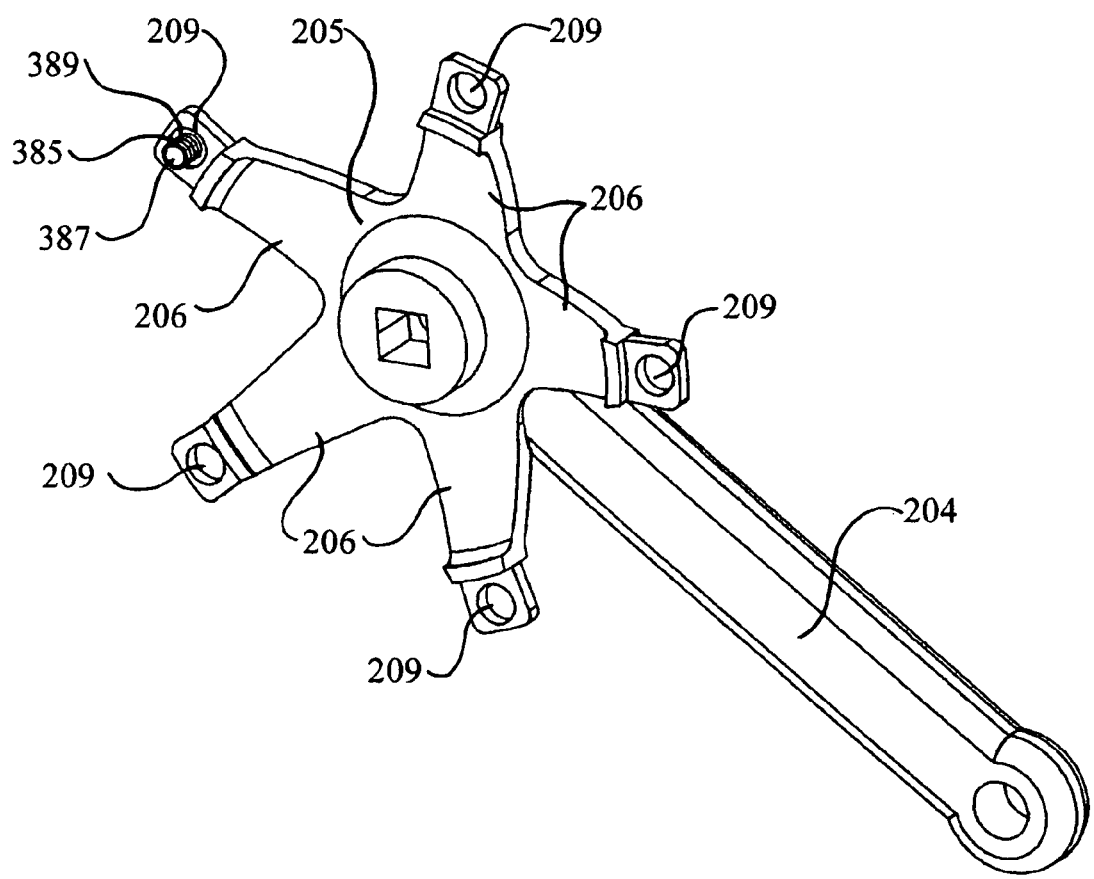
FIG. 14 is a perspective view of the link shown in FIG. 13 mounted at the chainring mount of a chainring assemblage.
Figure 15:
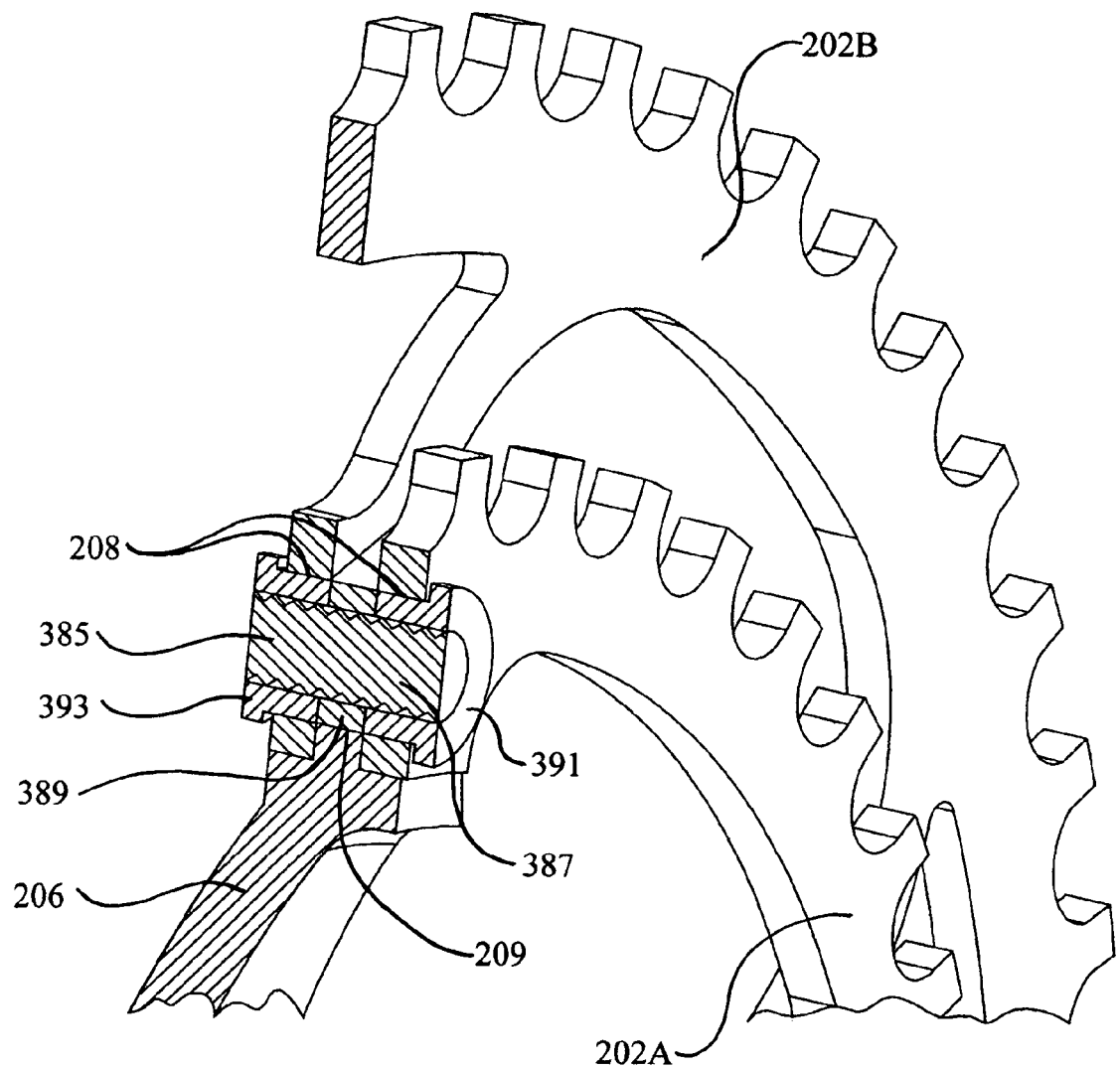
FIG. 15 is a sectional illustration of the link shown in FIG. 13 in a chainring assemblage.

An alternative embodiment 385 of the link of this invention is shown in FIGS. 13 through 15. Link 385 is configured as a load bolt assembly interposed at and between each of the attachment sites 209 and corresponding attachment locales 208. Load bolt assembly link 385 includes rigid bolt member 387 (which may or may not be threaded) of a length sufficient to extend through both the chainring mount attachment site 209 and corresponding attachment locales 208 of chainring or chainrings 202. A compressible yet resilient ring 389 snugly fits over a portion of member 387 and has a diameter sufficient to snugly fit the openings at attachment sites 209 and a length about equal to the cross sectional extent of the attachment sites. Ring 389 should be constructed of a durable material relatively resistant to wear, yet capable of being repeatedly compressed while reliably regaining original shape when compressive force is removed (for example, using a medium to high durometer urethane). As before, the geometry and/or materials utilized for link 385 dictate the sensitivity of the apparatus of this invention. Load bolt assembly 385 is secured utilizing nuts 391 and 393 (compression or threaded depending on bolt member 387 construction).

Figure 16:
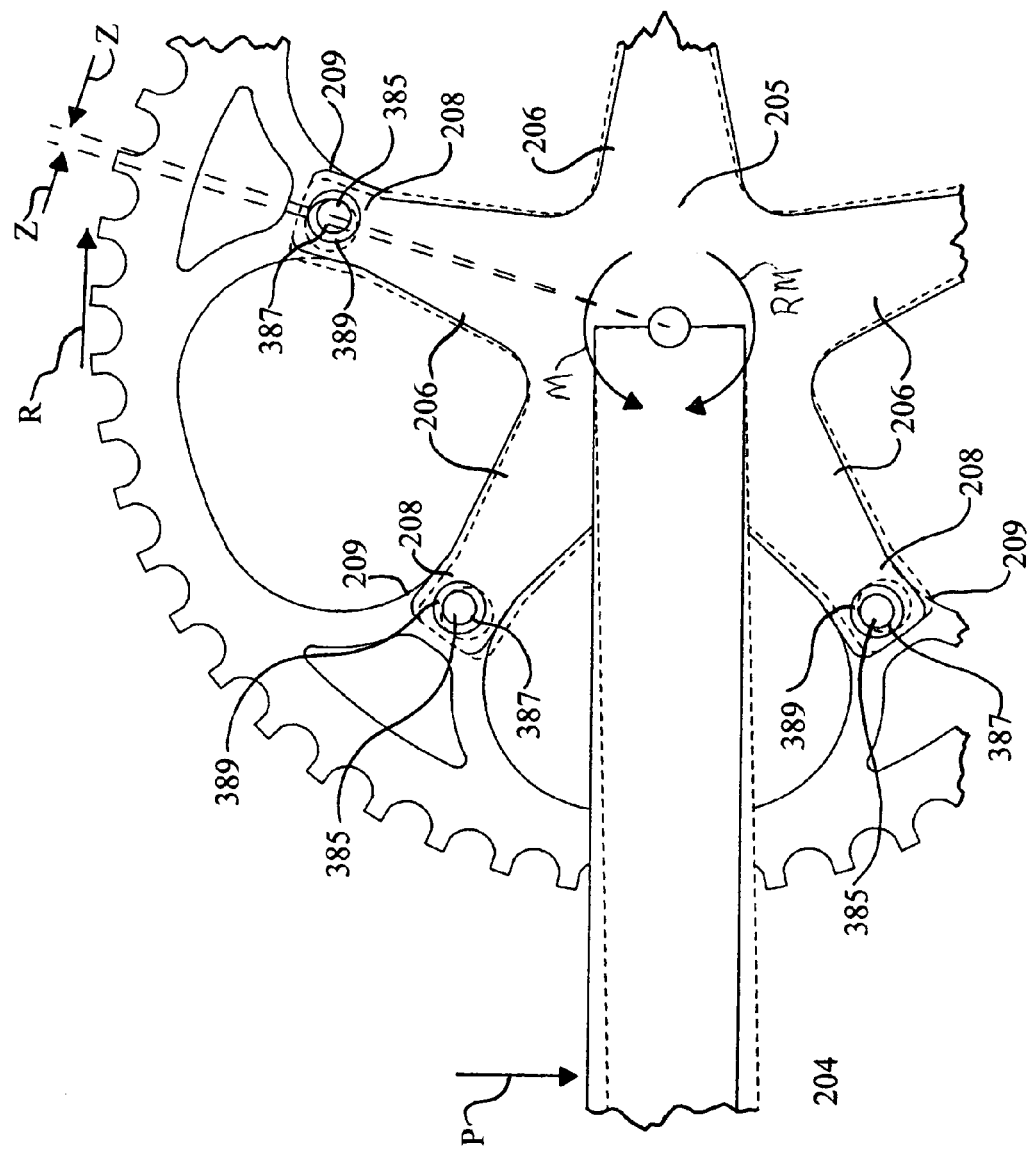
FIG. 16 is a schematic illustration showing operation of the link of FIG. 13.

FIG. 16 illustrates operation of load bolt assembly link 385. As the load moves from mount fingers 206 as heretofore described through link 385, ring 389 compresses. This compression produces compressive strain at ring 389 as well as limited decoupling between attachment locale 208 and attachment site 209 accommodated by ring 389 of link 385. Both the compressive strain at ring 389 and the extent Z of decoupling are demonstrably proportional to torque and can thus be utilized to develop an output indicative of a cyclist's power output as discussed above or using other mathematical processing as may be apparent given the particular embodiment (materials and geometry) and measurement means.

Ring 389 may be constructed of known pressure sensitive material used in pressure pad sensors and the like. In such case, rings 389 may be directly wired (in series) to provide an averaged output indicative of load in a system much like that heretofore described.

Figure 17:
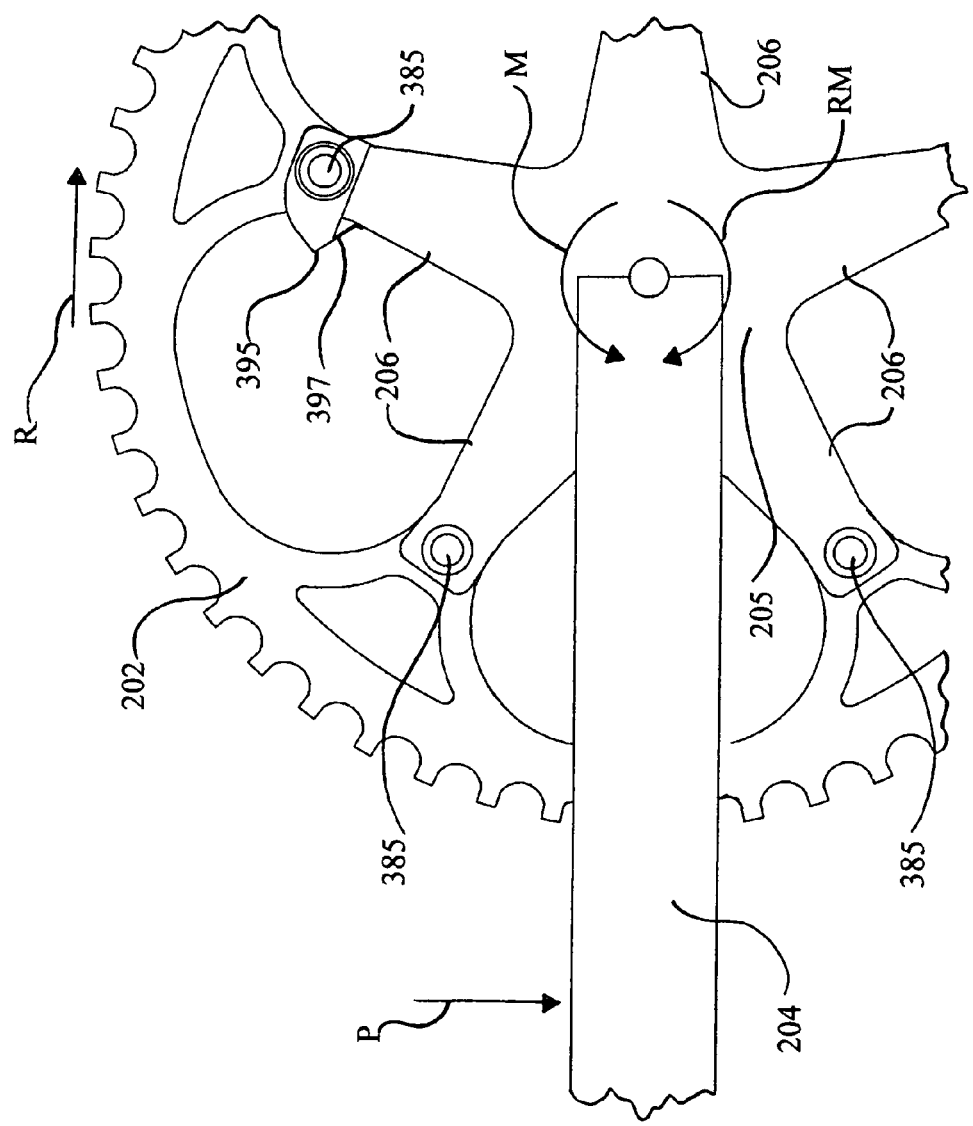
FIG. 17 is a schematic illustration showing one means of measuring decoupling accommodated by the link of this invention shown in FIG. 13.

Alternatively, as shown in FIG. 17, a strain gauge 395 (or multiple strain gauges 395 as discussed hereinabove) may be fixed to chainring 202. Strain gauge 395 includes cantilever 397 bearing at its distal end against mount finger 206. When no load is applied, cantilever 397 is not loaded. As load develops through mount finger 206 and is expressed through load bolt assembly link 385 and decoupling begins, cantilever 397 is also loaded, this loading being sensed by strain gauge 395 (strain gauge output being proportional to the extent of decoupling Z which is proportional to torque).

Figure 18:
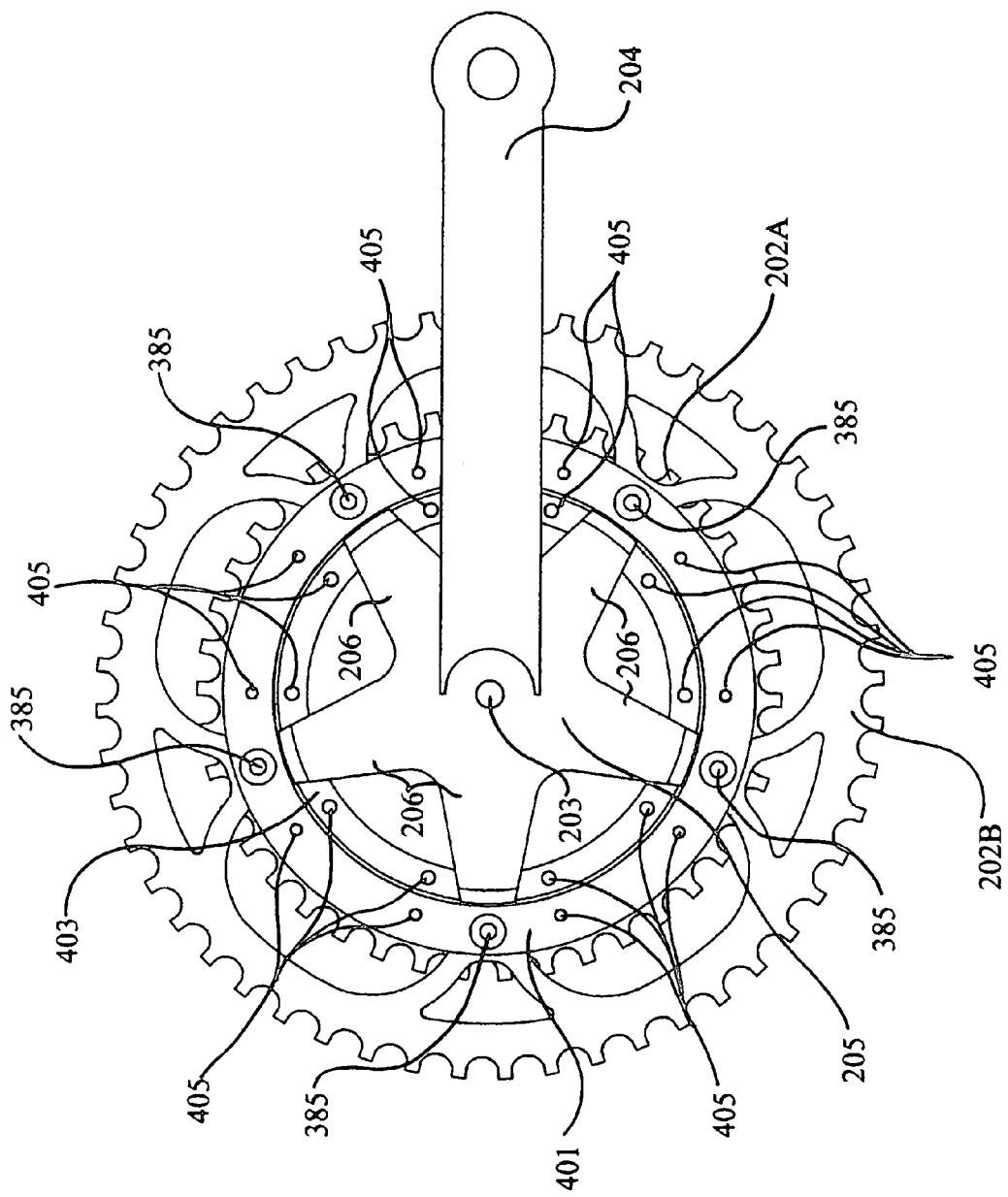
FIGS. 18 and 19 are illustrations showing a second means of measuring decoupling accommodated by the link of this invention shown in FIG. 13.
Figure 19:
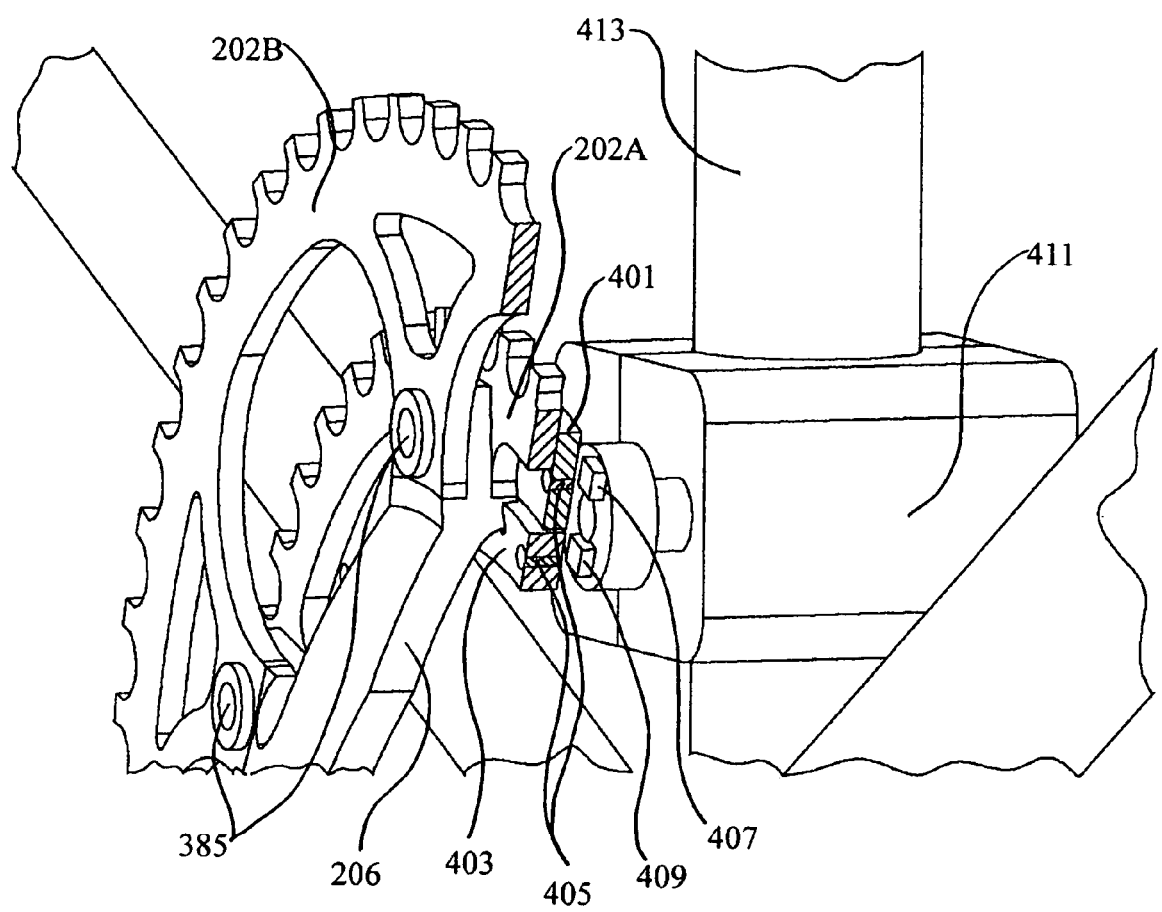

Another means of measuring loading in this embodiment is shown in FIGS. 18 and 19. Two magnet bearing rings, ring 401 attached to chainring(s) 202 and ring 403 attached to mount 205. Each ring 401 and 403 has an equal amount of magnets 405 radially aligned and attached at or in (and preferably spaced and equal distance around) the inner faces (facing the cycle frame) thereof. Outer and inner magnetic sensors 407 and 409, respectively (Hall effect sensors, for example), are mounted with electronics housing 411 on cycle frame member 413 using any conventional but reliably positionably secure attachment. Outer sensor 407 is aligned with magnets 405 of ring 401 and the inner sensor is aligned with magnets 405 of ring 403. Each magnetic sensor produces a voltage that is proportional to the magnetic flux passing through the magnetic sensor. Magnetic flux density is a function of Gauss level, distance of the magnets from the sensor and alignment of the magnetic sensors to the magnets.

The voltage signals from each or sensors 407 and 409 are presented at a comparitor circuit converting the voltage signals to square waves (i.e., to time signals) from which the delay between the signals, when present due to decoupling responsive to loading of load bolt assembly links 385, can be determined. The time delay output signal from the comparitor circuit is a square wave, the width of each pulse being proportional to torque (i.e., as torque increases pulse width increases). the pulse width/time time delay is then averaged for n samples and multiplied by a constant based on magnetic flux density to provide an averaged output signal indicative of torque. This output is further processed to refine accuracy thereof and used, together with cadence measurement, to provide stored and/or displayed indicia of work output of the cyclist.

As may be appreciated from the foregoing, apparatus and methods for measuring an applied load at a cycle chainring assemblage is shown, wherein no alteration of the conventionally provided major chain ring components or crank arms/axle is required. Thus an inexpensive and readily applicable training apparatus that is both accurate and durable is provided for cyclists seeking to enhance their performance.

What is claimed is:

1. For use in measurement of applied load at a chainring assemblage of a pedal powered device that includes a chainring mount having crank arms affixed thereto and chainring attachment sites defined at an outer extent thereof with at least one chainring having corresponding attachment locales identifiable with different ones of the attachment sites, an apparatus comprising a link adapted for interposition between one of the chainring mount attachment sites and one of the corresponding chainring attachment locales, said link having at least one of a geometry or material composition selected to accommodate measurement of load exhibited between the one attachment site and the corresponding one chainring attachment locale.

2. The apparatus of claim 1 wherein said link has a geometry adapted to offset the one attachment site from the one corresponding chainring attachment locale thereby accommodating load measurement based on one of compressive strain and tensile strain at said link.

3. The apparatus of claim 1 wherein said link comprises a load bolt assembly including a bolt member having a compressible yet resilient ring mounted at a portion thereof, said bolt member sized to be received at the one corresponding chainring attachment locale and said ring sized to be snugly received at the one attachment site, said load bolt assembly adapted to accommodate measurement of one of compressive strain at said ring or extent of decoupling accommodated by said load bolt assembly.

4. The apparatus of claim 3 further comprising magnetic sensing means for measuring extent of decoupling accommodated by said load bolt assembly.

5. The apparatus of claim 1 further comprising at least one additional link adapted for interposition between a different one of the chainring mount attachment sites and a different one of the corresponding chainring attachment locales, said link and said additional link being similarly constructed.

6. The apparatus of claim 5 further comprising a strain gauges equal in number to said links, each one of said strain gauges positioned at or adjacent to a different one of said links.

7. For use in measurement of applied load at a chainring assemblage of a pedal powered device that includes a chainring mount and at least one chainring, the mount having plural radiating fingers with chainring attachment sites defined at an outer extent of each of the fingers, the chainring having corresponding attachment locales identifiable with different ones of the attachment sites, an apparatus comprising:

a link having a first end adapted for connectability with one of the attachment sites, a second end adapted for connectability with one of the corresponding attachment locales, and a central portion between said ends configured to be resiliently load sensitive.

8. The apparatus of claim 7 further comprising means cooperative at said central portion for measuring one of compressive and tensile load developed thereat responsive to load exhibited between the one attachment site and the one corresponding attachment locale.

9. The apparatus of claim 8 wherein said cooperative means is a strain gauge.

10. The apparatus of claim 9 further comprising plural additional links each adapted for connectability between different ones of the attachments sites and corresponding attachment locales, and plural additional strain gauges equal in number to said additional links, said strain gauges connected to provide an average load measurement.

11. The apparatus of claim 7 wherein said first end of said link includes a slot thereat configured to receive therein the outer extent of the finger of the mount having the one attachment site thereat.

12. The apparatus of claim 7 wherein said first and second ends and said central portion of said link are located relative to one another so that said ends are angularly disposed.

13. A method for measuring applied load at a chainring assemblage of a pedal powered device, the applied load exhibited between a chainring mount and a chainring, the chainring mount having chainring attachment sites defined at an outer extent thereof and the chainring having corresponding attachment locales identifiable with different ones of the attachment sites, said method comprising the steps of:

linking one of the chainring mount attachment sites and one of the corresponding chainring attachment locales; and measuring one of strain developed at said linking or extent of decoupling between the one chainring mount attachment site and the one corresponding chainring attachment locale accommodated by said linking and providing an output indication based thereon.

14. The method of claim 13 wherein the linking step includes interposing a link between the one chainring mount attachment site and the one corresponding chainring attachment locale, said method further comprising the step of selecting at least one of link geometry or material composition to accommodate said measuring step.

15. The method of claim 13 wherein the chainring mount has plural radiating fingers with the chainring attachment sites defined at an outer extent of each of the fingers, said linking step further comprising interposing a link between each of the chainring mount attachment sites and each of the corresponding chainring attachment locales.

16. The method of claim 15 wherein the measuring step includes measuring strain developed at each of said interposed links and averaging strain measured at said interposed links.

17. The method of claim 13 wherein said linking step includes inserting a compressible link at one of the chainring mount attachment sites adapted for one of direct compressive strain measurement or indirect extent of decoupling measurement accommodated by compression thereof.

18. The method of claim 13 wherein the linking step includes interposing a link between the one chainring mount attachment site and the one corresponding chainring attachment locale, said method further comprising constructing said link of a durable material having a known modulus of elasticity.

19. The method of claim 13 wherein the one chainring mount attachment site and the one corresponding chainring attachment locale are offset relative to one another after the linking step.

20. The method of claim 13 further comprising the steps of measuring rotational cadence of a selected rotatable component of the pedal powered device and providing a cadence signal indicative thereof, processing said output indication and said cadence signal to provide an indication of cyclist power output, and one of storing and displaying said indication of cyclist power output.

* * * * *